United States Patent

[11] 3,603,939

[72] Inventors Andrew H. Bobeck
Chatham;
Henry E. D. Scovil, Gladstone; Alfred A. Thiele, East Orange, all of, N.J.

[21] Appl. No. 846,208
[22] Filed July 30, 1969
[45] Patented Sept. 7, 1971
[73] Assignee Bell Telephone Laboratories, Incorporated
Murray Hill, N.J.

[54] MAGNETIC DOMAIN PROPAGATION ARRANGEMENT
5 Claims, 6 Drawing Figs.

[52] U.S. Cl. .......... 340/174 TF, 340/174 SR, 340/174 QA, 340/174 2B
[51] Int. Cl. .......... G11c 11/14, G11c 19/00
[50] Field of Search .......... 340/174 TF, 174 SR

[56] References Cited
UNITED STATES PATENTS

| | | | |
|---|---|---|---|
| 3,092,813 | 6/1963 | Broadbent .......... | 340/174 |
| 3,503,055 | 3/1970 | Bobeck .......... | 340/174 |

*Primary Examiner*—James W. Moffitt
*Attorneys*—R. J. Guenther and Kenneth B. Hamlin ABSTRACT: Optimum size of single wall domains in a magnetic sheet is reduced by applying to each face of the sheet a high permeability overlay of prescribed thickness. Increased packing densities and operating margins result.

A. H. BOBECK
INVENTORS H. E. D. SCOVIL
A. A. THIELE
BY Herbert M. Shapiro
ATTORNEY

MAGNETIC DOMAIN PROPAGATION ARRANGEMENT

FIELD OF THE INVENTION

This invention relates to data processing arrangements and, more particularly, to such arrangements which include magnetic domain propagation circuits.

BACKGROUND OF THE INVENTION

The Bell System Technical Journal (BSTJ), Volume XLVI, No. 8, Oct. 1967, at page 1901 et seq., describes the propagation of a reverse-magnetized domain which is (self) bounded in the plane of the sheet by a single domain wall which closes on itself. Such a domain is free to move in the plane of the sheet and has sufficient "cohesiveness" to maintain its geometry when displaced in the sheet in response to an offset structured magnetic field (gradient).

A typical magnetic sheet in which single wall domains are moved comprises a rare earth orthoferrite or a strontium or barium ferrite. Each domain assumes the shape of a circle in the plane of a sheet of one of these materials. Each such sheet is characterized by a preferred direction of magnetization normal to the sheet, flux in a first direction along that normal being considered negative (−) and flux in a second direction being considered positive (=). A convenient convention permits the representation of a single wall domain in a sheet as an encircled plus sign where the circle represents the encompassing single wall domain.

There are a variety of techniques for moving single wall domains. One comprises offset conductor loops pulsed in sequence to attract domains to next consecutive positions as described in the above-mentioned BSTJ article. This technique permits a high degree of control over individual domains. But the current carrying requirements of such conductors makes it difficult to realize the minute dimensions required to manipulate, for example, domains of the order of microns.

Another technique for moving single wall domains employs a structured magnetically soft overlay in the sheet in which single wall domains are moved as described in copending application Ser. No. 732,705, filed May 28, 1968, and now U.S. Pat. No. 3,534,347 for A. H. Bobeck. The overlay generates attracting magnetic pole patterns in response to reorienting in-plane fields. The poles attract domains along a predictable path determined by the overlay pattern and the consecutive orientations of the field. This technique has the virtue that the overlay has no current carrying requirements and so can take full advantage of photolithographic techniques and can be adapted for manipulating domains of minute size. This technique also permits the movement of all domains in a sheet without discrete wiring connections.

The dimensions of the conductor loops or the structured overlay in the various propagation techniques are commensurate with the size of a domain moved thereby.

There exists a range of diameters in which a "single wall" domain is stable in any particular sheet depending on the thickness of that sheet as is explained in the BSTJ article mentioned above. A particular diameter for a domain within that range is usually established by a bias field generated uniformly in the sheet and of a polarity to constrict domains. Domain diameters typically can be varied by a factor of about 3 within this range.

It would, of course, be desirable to achieve a domain propagation structure in which the range of domain diameters may be determined for a particular magnetic sheet without changing the thickness of that sheet. For example, film growing techniques impose practical limitations on sheet thickness sometimes permitting the growth of sheets of only less than ideal thickness. Since sheet thickness is functionally related to the range of stable domain sizes, not infrequently optimum domain size in such sheets in much larger than presently achievable propagation circuit dimensions. The full packing density potential of the sheet cannot be realized as a result. An additional degree of freedom in the determination of stable domain size in a given magnetic sheet would contribute to increased flexibility on this score.

The problem is perhaps most fully appreciated in terms of an example of increased packing density in sheets of less than ideal thickness where domains would be relatively large. Such a sheet having a minimum stable domain size of about 3 mils would exhibit a substantial increase in packing density if a domain size of 1 mil could be achieved in the absence of a perhaps unrealizable increase in sheet thickness. This is an improvement of a factor of 3, realized, of course, along each dimension of the magnetic sheet, leading to about an order of magnitude increase in packing density.

Accordingly, an object of this invention is to provide a domain propagation arrangement characterized by a relatively small minimum stable domain size.

An improvement in operating margins may be understood when it is recalled that any circuit providing energy to a system, such as the subject domain propagation arrangement, does so at a nominal value about which the supply may vary. A usual variation may be ±10 percent. This could be improved, but improvements are costly. Of course, a variation of bias field is attended by a variation in domain size. This, in turn, leads to changes in performance which must be taken into account in the design of the arrangement.

Another object of this invention is, accordingly, to provide a domain propagation arrangement in which domains are relatively insensitive to variations in bias fields.

BRIEF DESCRIPTION OF THE INVENTION

The invention capitalizes on the fact that domain propagation devices are open flux structures and that high permeability material constrains flux in a manner to influence the size of a domain by modifying the least energy condition for that domain. If the amount of flux associated with a domain is equated to the capacity of an overlay film to accommodate that flux, a thickness for that film is established at which domains are stable outside the normal range of stable diameters characteristic of the magnetic sheet in the absence of that film. By placing uniform films of high permeability material of prescribed thickness on the surfaces of a sheet of material in which single wall domains are moved, the lower limit to domain size in that sheet is reduced by about a factor of 3.

DETAILED DESCRIPTION

Figure 1:
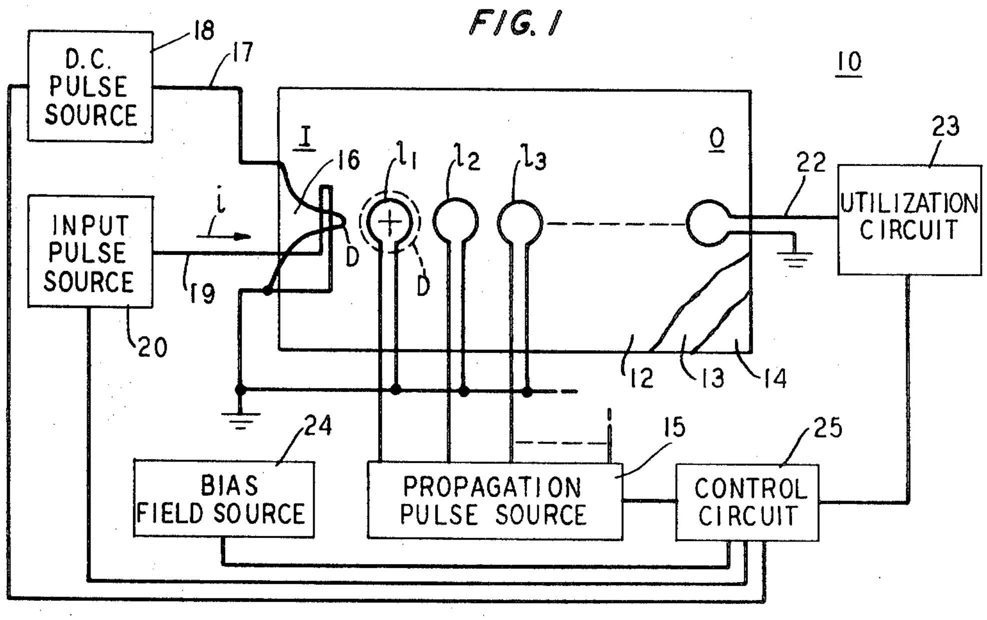
FIG. 1 is a schematic illustration of a domain propagation arrangement in accordance with this invention.
Figure 2:
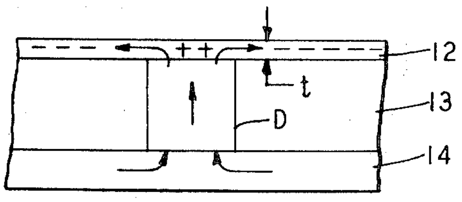
FIG. 2 is a cross section of a portion of the arrangement of FIG. 1.

FIG. 1 shows a domain propagation arrangement 10 including a laminate sheet 11 in accordance with this invention. Sheet 11 comprises three layers 12, 13, and 14 as shown in FIG. 2 in cross section and, in general functions in a manner consistent with the teachings of the above BSTJ article. That general organization of the arrangement will be described before proceeding with a description of the changes resulting therein from the laminate structure of sheet 11.

Layer 13 of sheet 11 comprises a domain propagation medium illustratively of thulium orthoferrite. The smallest domains observed in suitable platelets of thulium orthoferrite are 2.3 mils. For reference, the platelet comprises $TmFeO_3$, 1.9 mils thick having a moment of 140 gauss and a wall energy of 2.4 ergs/cm.$^2$.

Single wall domains are moved in any direction in such a sheet from input positions to output positions by any one of a variety of propagation arrangements. An illustrative propagation arrangement is represented by conductor loops $l_1$, $l_2$, and $l_3$ which are separated from sheet 13 by overlay 12 illustratively. The loops are connected between propagation pulse source 15 and ground and are pulsed in sequence to generate consecutively offset fields (gradients) for moving domains. The loop configurations are repeated in groups of three interconnected in sets in familiar series fashion to permit three-phase operation. Only a representative domain propagation channel is shown.

The selective input of domains to the propagation channel is controlled by the input arrangement at I in FIG. 1. An area 16 is defined in sheet 13 by a conductor 17 which is connected between a DC pulse source 18 and ground. In accordance with our adapted convention, area 16 is of positive magnetization and the remainder of sheet 13 is of negative magnetization. A conductor 19, of hairpin geometry, intersects a portion of area 16. Conductor 19 is connected between an input pulse source 20 and ground and serves to separate a tip area D of area 16 when a pulse of polarity indicated by arrow $i$ in FIG. 1 is applied. Tip area D defines a single wall domain (D of FIG. 1) for propagation when the pulse on conductor 19 terminates (and conductor $b_1$ is pulsed).

A representative output arrangement it identified at O in FIG. 1. The arrangement comprises a conductor 22 encompassing a terminal position in the propagation channel. Conductor 22 is connected between utilization circuit 23 and ground and serves to detect the passage of a domain into that terminal position. A bias field source 24 of FIG. 1 determines the selected diameter for domains in sheet 13.

Sources 15, 18, 20 and 24 and circuit 23 are connected to a control circuit 25 for activation and synchronization. The various sources and circuits may be any such elements capable of operating in accordance with this invention.

Domains in a magnetic sheet 13, in the absence of high permeability overlays 12 and 14 as shown in FIG. 2, collapse at a diameter which is a function of thickness of the platelet or sheet in which the domains are moved. This relationship is shown as a representative curve C in FIG. 3. The ordinate and abscissa are domain diameter $2r$ and platelet thickness $h$, respectively, normalized to $l_d=(\sigma_w)/4M_s^2)$ where $\sigma_w$ is the wall energy and $M_s$ is the saturation magnetization (of sheet 13). The thickness is represented on a logarithmic scale. Curve C can be seen to go through a minimum at about 1.0.

Figure 3:
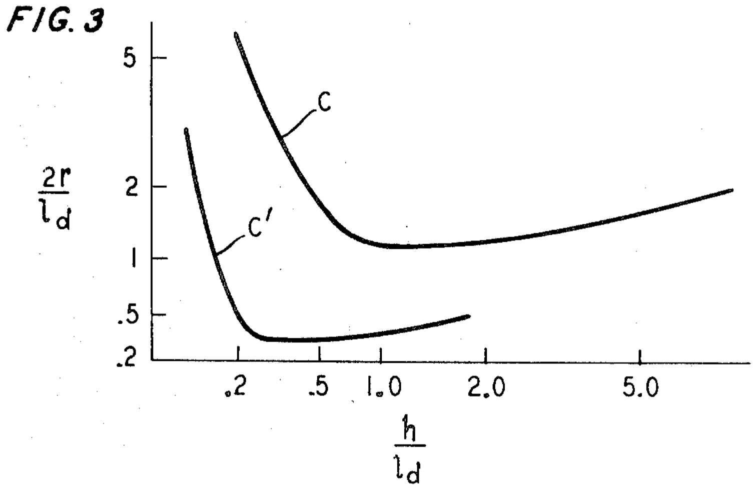
FIGS. 3 through 6 are graphs of pertinent parameters of the arrangement of FIG. 1.

Curve C′ in FIG. 3 shows a corresponding plot of collapse diameters for a sheet 13 having overlays 12 and 14 present in accordance with this invention. The minimum can be seen to be about 0.3.

Figure 4:
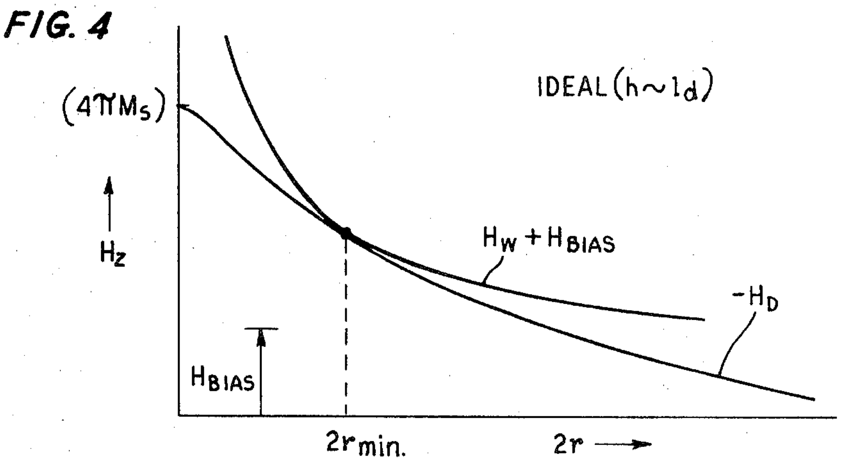

As discussed in the above-mentioned BSTJ article, an ideal thickness for sheet 13 is $h=l_d$. FIG. 4 is a plot of magnetic field component normal (along the Z axis) to sheet 13, acting on the min. versus domain diameter at the ideal thickness and with the high permeability overlays 12 and 14 absent. Two curves are shown, one for the wall field $H_w$ and the bias field $H_b$, and one for the magnetostatic field $H_D$. It is noted that the magnetostatic field increases to $4\pi M_s$ as domain diameter decreases.

The wall field and the bias field oppose the magnetostatic field, the latter trying to expand a domain. When the opposing fields exactly cancel and the curves are tangential, a domain effected thereby is at its minimum stable diameter $2r_{min}$. This occurrence is shown where the two curves meet in FIG. 4.

Figure 5:
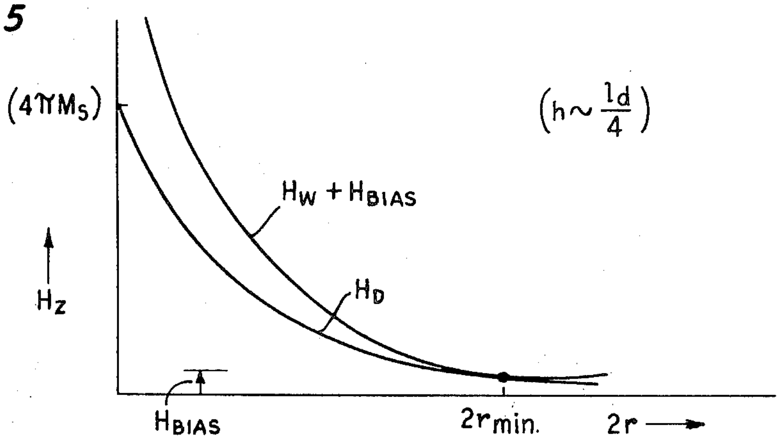

FIG. 5 shows similar curves for a sheet 13 having a (less than ideal) thickness $h \approx l_d / 4$. The magnetostatic curve (compare FIG. 4) is compressed, to the left as viewed, as a result of the reduced thickness. The new minimum stable domain diameter is larger than in FIG. 4.

Figure 6:
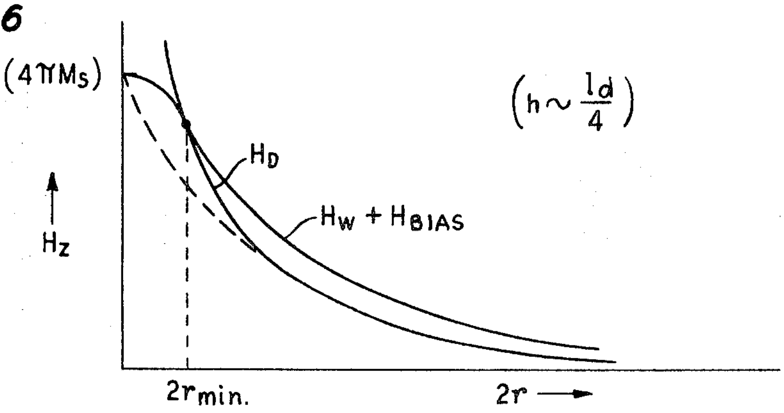

FIG. 6 shows the field curves when high permeability overlays are added in accordance with this invention. For reference, the term "high permeability" refers to films which exhibit large flux changes for small changes in field. A typical high permeability would be 1,000. We will represent the case where the sheet thickness $h \approx l_d/4$ (compare FIG. 5). The magnetostatic field curve is most greatly modified in the region of domain diameters less than that diameter for which the overlays saturate, as will be explained more fully hereinafter.

The significance of this modification can be appreciated more fully when it is recognized that the $H_D$ and $H_w+H_b$ field curves meet at a different point corresponding to a smaller minimum domain diameter as shown in the figure. Therefore, the high permeability overlays modify the dependence of the magnetostatic field on domain size.

A mathematical justification of the modification is as follows:

The amount of flux associated with a domain is represented by the flux density $B_0$ times the surface area $\pi r^2$ of the domain (viz, the area of the circle D in FIG. 1). A high permeability overlay having a flux density $B_1$ and a thickness $t$, shown in FIG. 2, saturates when $\pi r^2B_0=2\pi rtB_1$ or $t=rB_0/2B_1$. With a permalloy overlay of thickness $t$, the magnetostatic field $H_D$ remains essentially constant as a domain increases until the overlay is saturated because the plus poles associated with the domain spread uniformly through the overlay. As the domain diameter is increased beyond the point where the overlay is saturated, the added plus poles become localized and the net magnetostatic field decreases. The resulting equilibrium between wall field, bias field, and magnetostatic field permits a relatively small diameter domain to be realized in a structure with overlays in accordance with this invention.

It can be shown similarly that overlay 14 of thickness $t$ or greater, up to a thickness at which the layer cannot be saturated, acts as an axis of symmetry or ground plane and permits a selected domain size to be achieved at a thickness for sheet 13 half that which would be necessary without the overlay. Layer 14 has a thickness of at least $t$ in order to effect the magnetostatic field as described.

A laminate structure which is characterized by a reduction in minimum domain size for a particular domain propagation medium not only has the advantage of increased packing density but also has the advantage that a domain in such a structure is less sensitive to variation in bias field as has been stated hereinbefore. A practical bias field source has a permissible variation of ±10 percent from its nominal value. As is well understood, such a variation detracts from operating margins. In a laminate structure in accordance with this invention, such a variation in bias field results in relatively small variations in domain diameter. This is particularly beneficial when a bar and T-shaped overlay is used in a propagating implementation.

It is contemplated, also, that a propagation mechanism employing a bar and T-shaped overlay permits the fullest realization of ultimate packing density potential. These overlay geometries have no current carrying requirements that necessitate a plating operation to increase the thickness of photodeposited layers at the expense of resolution. Instead, these overlays enjoy the highest resolution provided by photoresist techniques. In fact, bar and T-shaped overlays having pattern repeats of 0.8 mil are presently achievable; repeats of 0.1 mil are contemplated. Domains with diameters of less than 0.1 mil are movable with such overlays and high permeability overlays in accordance with this invention enable magnetic sheets of practical thickness to exhibit domains of such size. Consequently, the full packing density permitted by high resolution bar and T-shaped overlays can be realized.

What has been described is considered only illustrative of the principles of this invention. Accordingly, many and varied modifications can be devised by one skilled in the art in accordance with those principles within the spirit and scope of this invention.

What is claimed is:

1. Apparatus comprising a sheet of magnetic material in which a single wall domain having a radius $r$ can be moved, said domain having a flux density $B_o$, first and second layers of relatively high permeability material contiguous first and second surfaces of said sheet, said first layer having a flux density $B_1$ and a thickness $t$ such that said layer magnetically saturates locally in the presence of a domain having a radius $r=2t$ $(B_1/_0)$, said second layer having at least a thickness $t$.

2. Apparatus in accordance with claim 1 wherein said second layer has a thickness for essentially unlimited flux handling capability.

3. Apparatus in accordance with claim 1 in combination with means for moving said domain in said sheet and means for detecting domains in said sheet.

4. A combination in accordance with claim 3 also including means for introducing single wall domains into said sheet selectively.

5. Apparatus comprising a sheet of magnetic material in which single wall domains can be moved, each of said domains having associated therewith a magnetostatic field and means comprising a magnetic layer coupled to said sheet and having a thickness for maintaining constant said magnetic field for domains of significantly different sizes.